May 19, 1959     J. J. SHAPIRO ET AL     2,886,964
POROSIMETER

Filed Jan. 16, 1956     3 Sheets-Sheet 1

INVENTORS
JUSTIN J. SHAPIRO AND
NATHANIEL M. WINSLOW
BY Herman L. Gordon
ATTORNEY

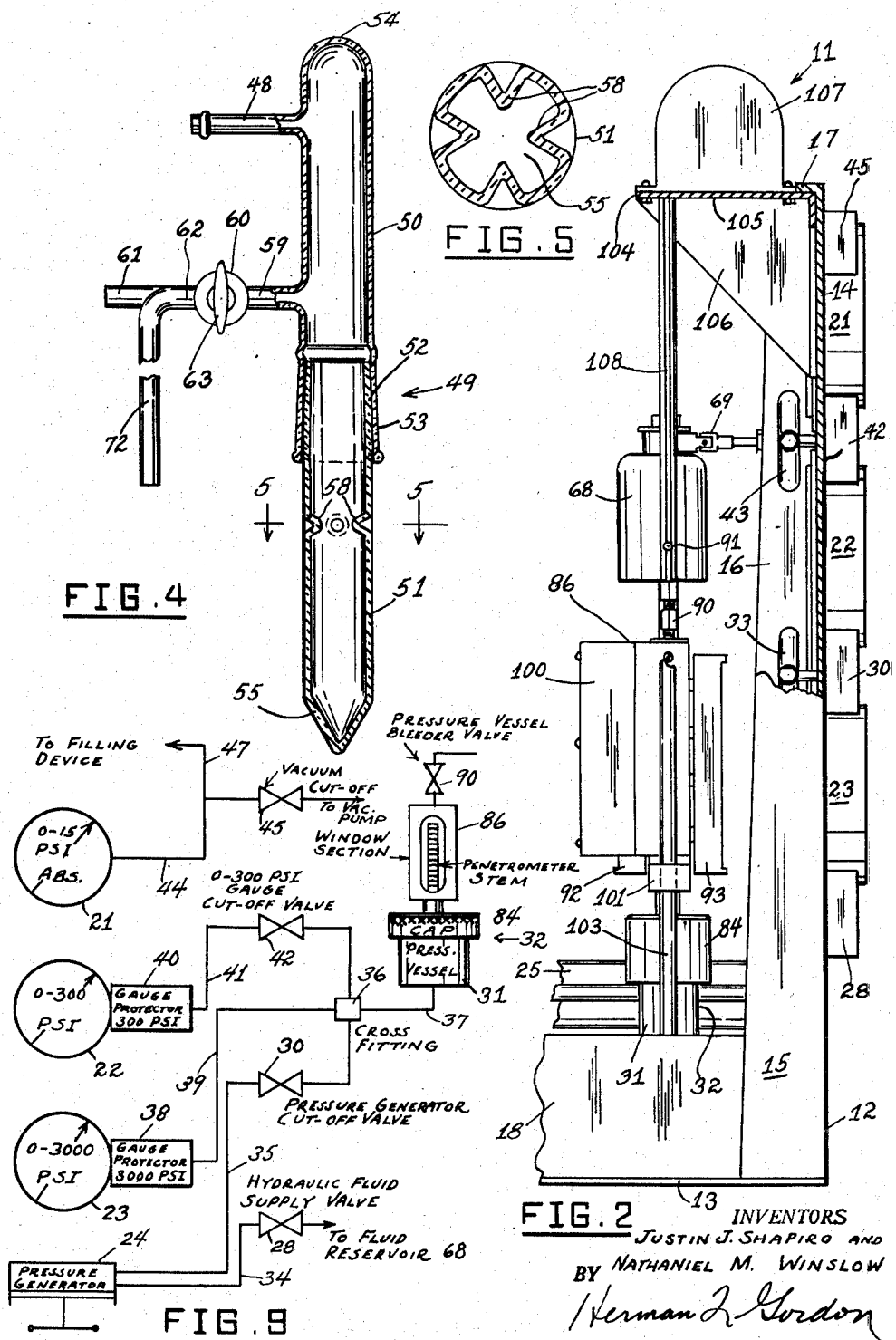

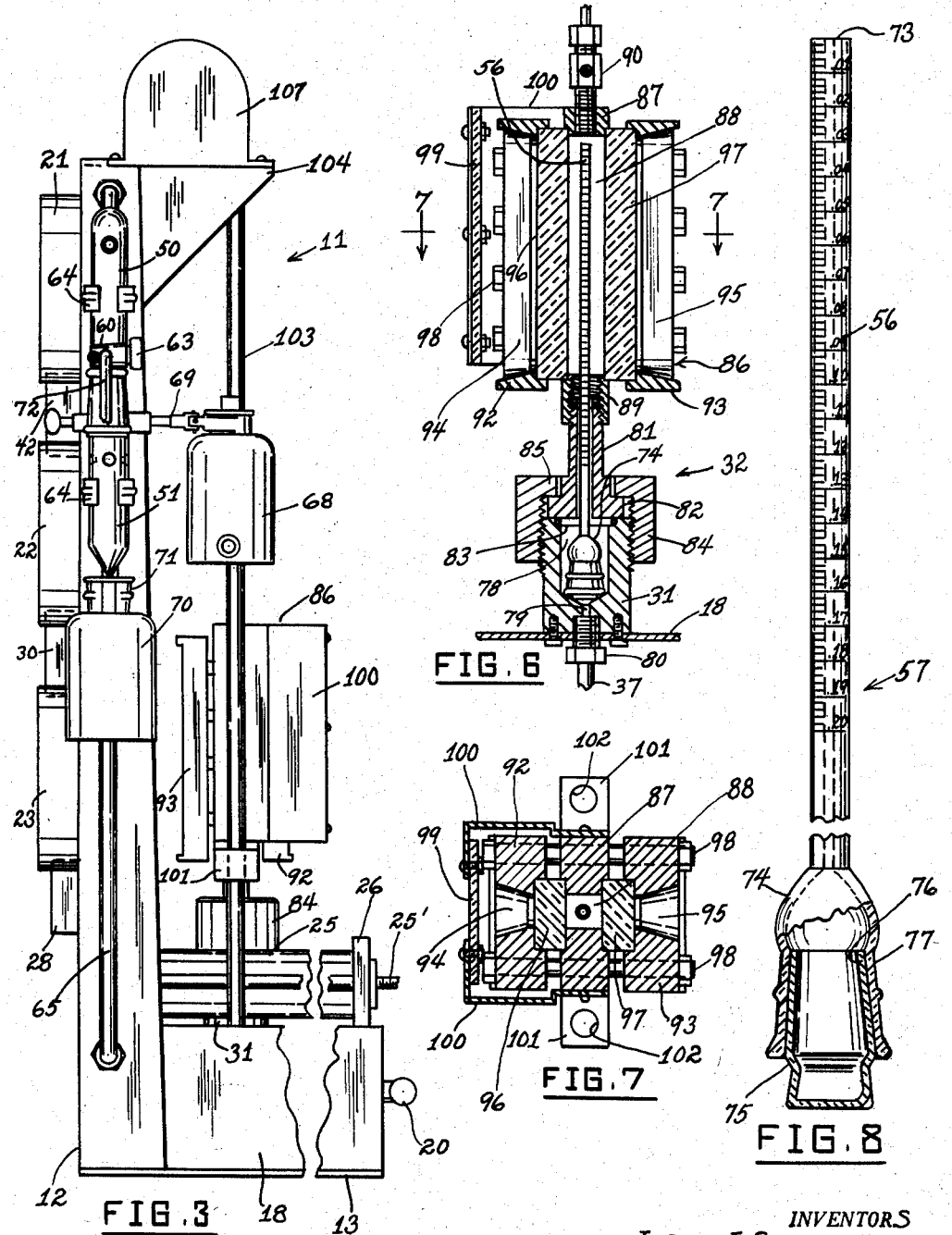

United States Patent Office 2,886,964
Patented May 19, 1959

2,886,964

POROSIMETER

Justin J. Shapiro, Silver Spring, Md., and Nathaniel M. Winslow, Cleveland, Ohio; said Shapiro assignor to American Instrument Company, Inc., Silver Spring, Md.

Application January 16, 1956, Serial No. 559,236

13 Claims. (Cl. 73—38)

This invention relates to apparatus for measuring the pore sizes of porous materials, and more particularly to an apparatus for measuring the pore sizes and volumes of the pores of materials by the mercury-intrusion method.

A main object of the invention is to provide a novel and improved apparatus for determining the pore size spectrum of penetrable or porous solid material by the mercury-intrusion method, said apparatus being simple in construction, being easy to operate, and providing accurate indications of the pore volumes and pore diameters in the material.

A further object of the invention is to provide an improved apparatus for determining the pore volumes and pore diameters of porous material, said apparatus being relatively compact in size, involving inexpensive components, and being safe to operate.

A still further object of the invention is to provide an improved apparatus for measuring the pore volumes and diameters of porous material by a method employing hydraulic fluid under pressure to produce penetration of the material, and employing means to measure the penetration volumetrically over a relatively wide range of applied hydraulic pressures, whereby a complete spectrum of the pore sizes of the material under examination may be obtained.

Further objects and advantages of the invention will become apparent from the following description and claims, and from the accompanying drawings, wherein:

Figure 2 is a fragmentary vertical cross-sectional view taken substantially on the line 2—2 of Figure 1.

Figure 3 is a fragmentary side elevational view taken substantially on the line 3—3 of Figure 1.

Figure 4 is an enlarged vertical cross-sectional view taken through the filling device employed in the apparatus of Figures 1 to 3.

Figure 5 is an enlarged horizontal cross-sectional detail view taken on the line 5—5 of Figure 4.

Figure 6 is a vertical cross-sectional detail view taken through the pressure vessel and observation chamber of the porosimeter on the line 6—6 of Figure 1.

Figure 7 is a horizontal cross-sectional view taken on the line 7—7 of Figure 6.

Figure 8 is an enlarged elevational view, partly in vertical cross-section, of the penetrometer member employed in the porosimeter apparatus of Figure 1.

Figure 9 is a schematic diagram showing the conduit connections of the porosimeter of Figure 1.

Figure 1:
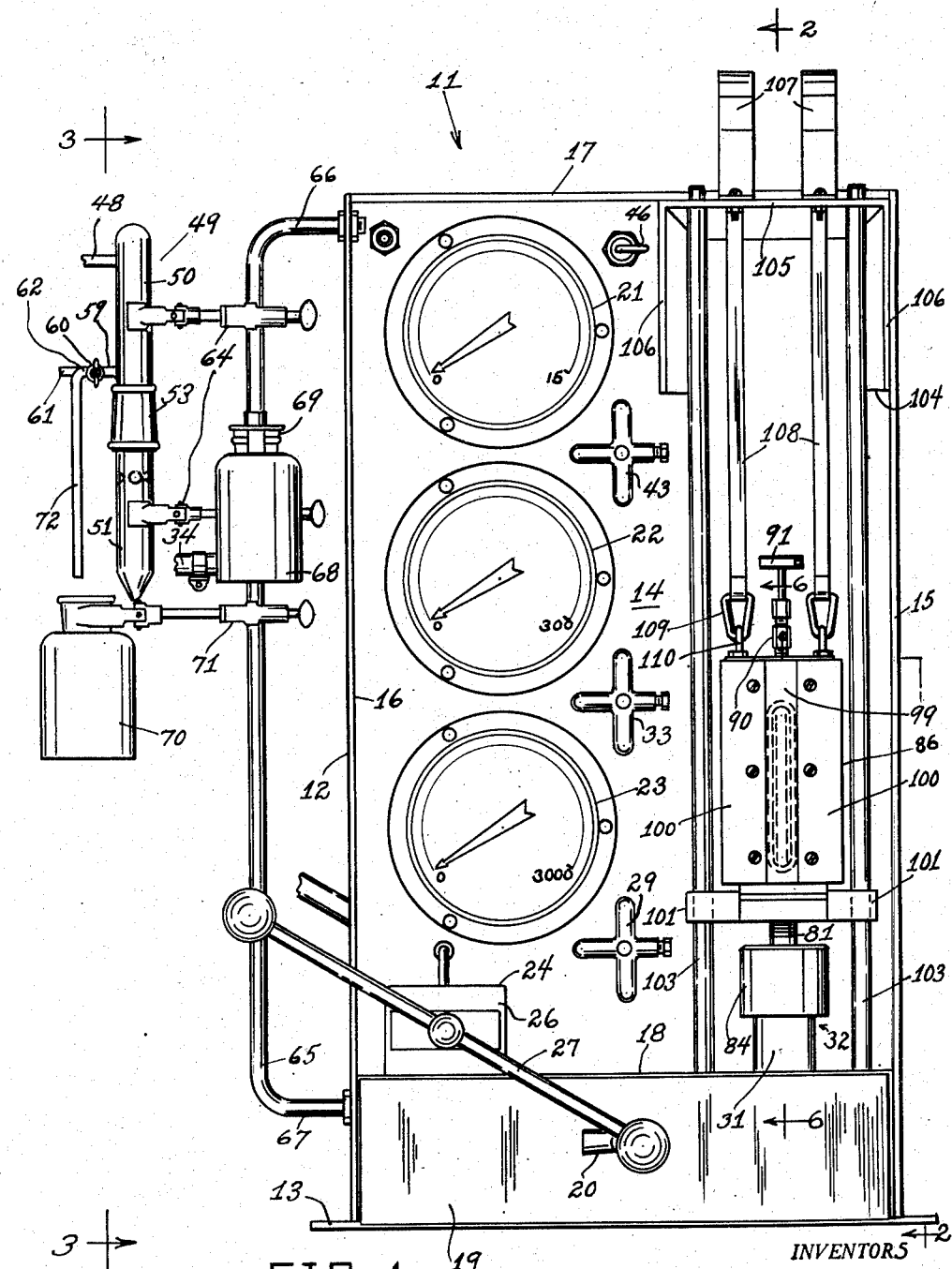
Figure 1 is a front elevational view of an improved porosimeter constructed in accordance with the present invention.

The apparatus of the present invention has for its prime purpose to measure the pore sizes and volume of porous material by the mercury intrusion method.

According to this method, the diameter D, in microns, of the smallest pore in the material entered by mercury under an absolute pressure P, in pounds per square inch, follows the relationship $$D = \frac{175}{P}$$

In the apparatus of the present invention, a safe and convenient gas-free hydraulic system is used to transmit pressure from a pressure generator to a pressure vessel containing a calibrated transparent chamber, such as the penetrometer of Figure 8, exposed to the pressure in said pressure vessel and containing the porous material under test. The volume of penetration by mercury after application of pressure, at each pressure, is read on the calibrated stem of the penetrometer, which is visible through a transparent window section of the pressure vessel.

Referring to the drawings, 11 generally designates a porosimeter constructed in accordance with the present invention. The porosimeter 11 comprises an upstanding supporting housing 12 comprising a horizontal base plate 13 adapted to be secured to a table or other suitable horizontal support. Rigidly secured to base plate 13 is the vertical rear wall 14 provided with the vertical side flanges 15 and 16, also rigidly secured at their lower ends to base plate 13. Rear wall 14 is provided with a horizontal top flange 17 connecting the top ends of side flanges 15 and 16.

Secured on base plate 13, between the lower portions of the side flanges 15 and 16 is a rectangular subhousing 18, defining an enclosure in which is slidably mounted a drawer 19 for storing various accessory items of the apparatus, and the like. The front wall of drawer 19 is provided with a handle 20.

Mounted in the rear wall 14 at one side portion of the upstanding support 12 are the vertically spaced respective pressure gauges 21, 22 and 23. Gauge 21 measures pressure from zero to 15 pounds per square inch absolute, gauge 22 measures pressure from zero to 300 pounds per square inch, and gauge 23 measures pressure from zero to 3000 pounds per square inch.

Mounted on the top wall of subhousing 18 subjacent to pressure gauge 23 is a conventional pressure generator or pump 24, for example, of a type having a cylinder 25 and a piston actuated by a screw member 25' threaded through the front wall 26 of the cylinder and provided with an operating handle 27. Cylinder 25 receives hydraulic fluid from an external fluid reservoir through a manually operated control valve 28 mounted on rear wall 14 and provided with the operating handle 29.

The outlet of cylinder 25 is connected through a manually operated control valve 30 to the bottom member 31 of a pressure vessel 32, said bottom member being secured vertically to the top wall of subhousing 18 at the right side of the apparatus, as viewed in Figure 1. Valve 30 is mounted on wall 14 above valve 28 and is provided with the operating handle 33.

As shown in Figure 9, the hydraulic fluid supply valve 28 is connected in the fluid supply conduit 34 connecting pressure generator 24 to the fluid reservoir. The pressure cut-off valve 30 is connected in an outlet conduit 35 connecting the outlet of the pressure generator to a cross fitting 36, which is connected by a conduit 37 to the bottom member 31 of the pressure vessel 32. Gauge 23 is connected through a conventional gauge protector 38 and a conduit 39 to cross fitting 36.

Gauge 22 is connected through a conventional gauge protector 40 and a conduit 41 to the cross fitting 36, said conduit 41 including a manually controlled cut-off valve 42 mounted on wall 14 above valve 30. Valve 42 is provided with the operating handle 43.

Gauge 21 is connected through a conduit 44 and a vacuum cut-off valve 45 to a conventional external vacuum pump, not shown. Valve 45 is mounted on wall 14 above valve 42 and is provided with an operating handle 46. Also connected to the conduit 44 is a conduit 47 connected to the upper conduit-connection tube 48 of a filling device 49, shown in detail in Figures 4 and 5.

Filling device 49 comprises a tubular upper chamber element 50 and a tubular lower chamber element 51 having a tapered top end portion 52 adapted to be sealingly and detachably secured in the downwardly flaring lower end portion 53 of upper chamber element 50. Chamber element 50 has the rounded top end wall 54. Chamber element 51 has the conical bottom end 55 adapted to receive the end of the calibrated tube portion 56 of a penetrometer member 57, shown in Figure 8, and presently to be described. Lower chamber element 51 is formed, a substantial distance above its conical bottom end 55, with a plurality of inwardly projecting, identical, evenly spaced indentations of generally conical shape, as shown at 58 in Figures 4 and 5, adapted to support the penetrometer stem 56 in an axial position in the filling device 49.

The chamber elements 50 and 51 are formed of suitable transparent material, such as glass, or the like.

As shown in Figure 4, the upper chamber element 50 is provided with an upper conduit connection tube 48 and with a lower conduit element 59 provided with a three-way stopcock 60 formed with an atmospheric vent conduit 61 and another conduit 62, said stopcock being of conventional construction. The stopcock 60 is provided with an operating element 63 which may be rotated to respective different positions in which the stopcock (1) seals off conduit 59, (2) connects conduit 59 to conduit 62, or (3) connects conduit 59 to atmospheric vent conduit 61.

The filling device 49 is supported by conventional supporting clamps 64, 64 on the upper portion of a vertical bracket rod 65 having respective top and bottom arms 66 and 67 secured to the vertical side flange 16 of the upstanding supporting housing 12.

Designated at 68 is a bottle containing suitable hydraulic liquid, such as alcohol, or the like, said bottle being adjustably supported on bracket rod 65 by a conventional supporting clamp 69 engaging the neck of the bottle. Conduit 34 is connected to the lower portion of bottle 68.

Designated at 70 is another bottle, adapted to contain mercury, which is supported on bracket rod 65 by a conventional supporting clamp 71, the bottle 70 being located below the filling device 49 and being so arranged that the depending vertical portion 72 of the conduit element 62 may be at times engaged through the neck of bottle 70 into the mercury contained therein, whereby mercury may be admitted into conduit 59 and into the filling device, as will be presently described.

Referring to Figure 8, the penetrometer 57 comprises the calibrated glass stem 56, open at one end 73, and formed at its other end by a flaring, bell-shaped member 74. Designated at 75 is a glass cup member having a tapered top portion 76 shaped to be received inside the flaring lower portion 77 of the member 76 and to be sealed therein, as will be presently described. Cup member 75 is employed as a container for the porous material to be tested.

As mentioned above, the bottom member 31 is secured vertically to the top wall of subhousing 18. Said bottom member 31 is generally cylindrical in shape and is formed with an internal cavity 78 adapted to receive the bell-shaped member 74 of the penetrometer, as shown in Figure 6. A vertical axial bore 79 in the bottom wall of member 31 connects cavity 78 to a conduit fitting 80, to which conduit 37 is connected.

Designated at 81 is an upstanding sleeve member having an annular bottom flange 82 engageable on the top rim of member 31, a sealing ring 83 of rubber or similar deformable resilient material being disposed in a seat formed in said top rim to provide a seal between flange 82 and said rim. A clamping skirt 84 is threadedly engaged with the upper portion of member 31, said skirt having an inwardly extending annular top flange 85 engageable on flange 82 to sealingly clamp sleeve member 81 in communication with cavity 78. The bore of sleeve member 81 is of sufficient size to freely receive and vertically support the penetrometer stem 56 therein.

Designated generally at 86 is an observation chamber sealingly secured on the top end of sleeve member 81. Said observation chamber comprises a generally rectangular block 87 formed with a central vertical slot 88. The bottom of the block is tapped to engage with external threads on the top end of member 81, as shown at 89, and to define a passage connecting the bore of member 81 with slot 88. The top of block 87 is tapped to receive a bleeder valve 90 having a manually operated control handle 91.

Disposed parallel to and on opposite sides of block 87 are respective additional rectangular blocks 92 and 93 formed with respective vertical slots 94 and 95 aligned with slot 88. Respective relatively thick, transparent blocks 96 and 97, of glass, or other suitable transparent material, are disposed in rectangular seats provided in the blocks 87, 92 and 93 on opposite sides of slot 88, defining observation windows, and sealing slot 88 with respect to the atmosphere. A plurality of vertically spaced, horizontal clamping bolts 98 extend through the blocks 92, 87 and 93 on opposite sides of the transparent blocks 96 and 97 to sealingly fasten the members of the observation chamber 86 together.

An auxiliary transparent window plate 99 is secured parallel to block 92 in substantially overlying relationship to the slot 94 therein, as by respective vertical angle brackets 100, 100, fastened to the side marginal portions of plate 99 and to the vertical side edges of block 87, as shown in Figure 7.

At its lower end, the block 87 is formed with respective outwardly projecting lugs 101, 101, which are formed with respective vertical apertures 102. Designated at 103, 103 are respective vertical guide rods rigidly secured at their bottom ends to the top wall of subhousing 18 at opposite sides of member 31. Designated at 104 is a bracket member secured to the top portion of rear wall 14 above the member 31, said bracket member having a forwardly extending horizontal top flange 105 and respective triangular side flanges 106, 106. The top ends of guide rods 103 are rigidly secured to flange 105.

Mounted on flange 105 are a pair of conventional spring sash balance assemblies 107, 107 disposed symmetrically on opposite sides of the central vertical transverse plane of the observation chamber 86 and having the respective extensible and retractile flexible bands 108, 108, which extend through top flange 105. Each band 108 is provided at its end with a link member 109, which in turn is connected to an eye element 110 secured to the top of block 87.

As will be readily apparent, the guide rods 103, 103 serve to guide the observation chamber 86, sleeve 81, and skirt member 84 for vertical movement, the counterbalance assemblies 107 serving to enable these members to be easily raised and lowered, and further serving to retain these members in elevated positions when raised, thus facilitating the insertion or removal of the penetrometer 57 and insuring accurate vertical movement of these members, whereby damage to the penetrometer stem is prevented.

In determining the pore sizes and volume of a material, a weighed sample of the material of known volume or density is placed in the penetrometer cup member 75, and said cup member is sealingly secured in the bell portion 77 of the penetrometer by means of any suitable cement, such as Pyseal, Varniton, or similar thermoplastic cement. The penetrometer 57 is then placed, stem down, in the filling device 49, which is then closed and is connected to the vacuum pump by the conduit 47 engaged on the tube element 48, as above described.

The mercury bottle 70 is then clamped in filling position with the mercury filling tube 72 well below the surface of the mercury.

With vacuum valve 45 open and the filling device stopcock 60 closed to both tube 61 and conduit 62, the vacuum pump is started. The stopcock 60 is then carefully manipulated by means of its valve handle 63 to draw the mercury just beyond the stopcock into conduit 59 but not into the filling chamber.

The filling chamber is then evacuated to a pressure below 100 microns, after which vacuum valve 45 is closed.

Sufficient mercury is then admitted into the filling device 49 by means of stopcock 60 to fill the penetrometer 57. The stopcock 60 is then carefully manipulated to admit air into the filling device, forcing the mercury into the penetrometer, the stopcock being closed at a pressure of about 6.5 pounds per square inch absolute, as observed on gauge 21, sufficient to completely fill the penetrometer.

With the penetrometer completely filled and the mercury bottle 70 removed, the filling device 49 is carefully unfastened from clamps 64 and inverted, being refastened to said clamps in inverted position. The drop in the level of the mercury column in stem 56, corresponding to the volume of pores entered at this pressure, is then noted, said pressure being the sum of the pressure due to the height of mercury above the sample (1 inch of mercury=0.492 pound per square inch gauge) and the indicated absolute pressure.

The stopcock 60 is then opened at intervals, admitting atmospheric pressure, as indicated on gauge 21, and the pore volumes are noted, as desired.

The penetrometer 57 is then carefully removed from the filling device 49 and is weighed to the nearest 10 milligrams.

The hydraulic fluid bottle 68 is then adjusted to a height such that the liquid level will be below the rim of member 31 with the skirt member 84 and sleeve 81 removed therefrom. Valves 28, 30 and 42 are opened and bleeder valve 90 is opened. Skirt member 84 is unscrewed from member 31 and the observation chamber 86 and elements 81 and 84 are lifted to the top of the supporting housing 12 along guide rods 103. The penetrometer 57 is then inserted, with the bell portion 74 and cup member 75 thereof received in member 31, and with the calibrations on stem 56 facing forwardly. The members 86, 81 and 84 are then lowered over the stem 56, as shown in Figure 6, and the skirt member 84 is then screwed onto member 31.

The hydraulic fluid bottle 68 is then elevated on rod 65 to a position adjacent the top of housing 12, closing bleeder valve 90 as soon as liquid emerges therefrom.

Valve 28 is then closed and the pressure in chamber 32 is then raised by rotating the handle 27 of the pressure generator 24, the pore volumes and pore diameters (as related to gauge pressure) being noted from the mercury column in stem 56 at appropriate intervals. Since stem 56 is open at its top end 73, the pressure in chamber 32 is applied to the mercury column in said stem and to the mercury in cup member 75, causing the height of said mercury column to change with the variations in pressure.

When a pressure of about 250 pounds per square inch is reached, valve 42 is closed, the higher pressures being then read on the gauge 23.

When the pore size spectrum readings have been obtained over the desired pressure range, the pressure is relieved by backing off the pressure generator screw 25' slightly. Valve 28 (hydraulic fluid supply), bleeder valve 90, and valve 42 are then opened. The bottle 68 is then lowered to a position below the top rim of member 31, allowing the instrument to drain. The pressure vessel 32 is then opened and the penetrometer 57 is removed, whereby the apparatus is ready for another determination.

While a specific embodiment of an improved apparatus for measuring the pore sizes and volume of the pores in material has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a porosimeter, an upstanding support, a pressure vessel secured to the lower portion of said support, said pressure vessel being provided with an observation chamber detachably secured to the top portion of the pressure vessel, said observation chamber being formed with a vertical bore portion adapted to receive and vertically support the stem of a penetrometer, vertical guide means rigidly secured to said support, a penetrometer mounted in said pressure vessel and having a tubular stem open at its top end disposed vertically in said bore portion, said penetrometer being adapted to contain a specimen whose porosity is to be tested, and means on the observation chamber slidably engaged with said guide means, whereby said observation chamber is guided for vertical movement when it is detached from the pressure vessel, whereby to facilitate the insertion or removal of the penetrometer.

2. In a porosimeter, an upstanding support, a pressure vessel secured to the lower portion of said support, an observation chamber detachably secured to the top portion of said pressure vessel, said observation chamber being formed with a vertical bore portion adapted to receive and vertically support the stem of a penetrometer, vertical guide means on the support slidably engaged with said observation chamber, whereby to facilitate the insertion or removal of the penetrometer when the observation chamber is detached from the pressure vessel, and a pump mounted on said support and communicating with said pressure vessel.

3. In a porosimeter, an upstanding support, a pressure vessel secured to the lower portion of said support, an observation chamber detachably secured to the top portion of said pressure vessel, said observation chamber being formed with a vertical bore portion adapted to receive and vertically support the stem of a penetrometer, vertical guide means on the support slidably engaged with said observation chamber, whereby to facilitate the insertion or removal of the penetrometer when the observation chamber is detached from the pressure vessel, a pump mounted on said support and communicating with said pressure vessel, and counterbalance means on said support connected to said observation chamber and arranged to support said chamber in a vertically adjusted position along said guide means.

4. In a porosimeter, an upstanding support, a pressure vessel secured to the lower portion of said support, an observation chamber detachably secured to the top portion of said pressure vessel, said observation chamber being formed with a vertical bore portion adapted to receive and vertically support the stem of a penetrometer, vertical guide means on the support slidably engaged with said observation chamber, whereby to facilitate the insertion or removal of the penetrometer when the observation chamber is detached from the pressure vessel, a pump mounted on said support and communicating with said pressure vessel, and a pressure indicator on said support and communicating with said pressure vessel.

5. In a porosimeter, an upstanding support, a pressure vessel secured to the lower portion of said support, an observation chamber detachably secured to the top portion of said pressure vessel, said observation chamber being formed with a vertical bore portion adapted to receive and vertically support the stem of a penetrometer, vertical guide means on the support slidably engaged with said observation chamber, whereby to facilitate the insertion or removal of the penetrometer when the observation chamber is detached from the pressure vessel, a pump mounted on said support and communicating with the pressure vessel, a hydraulic fluid reservoir connected to said pressure vessel through said pump, and means detachably securing said reservoir in a vertically adjusted position on said support.

6. In a porosimeter, an upstanding support, a pressure vessel secured to the lower portion of said support, an observation chamber detachably secured to the top portion of said pressure vessel, means to generate a fluid pressure within said pressure vessel and a sample container disposed in said pressure vessel and having a transparent stem portion, open at its top end and extending vertically into said observation chamber, said observation chamber being formed with a vertical bore portion receiving and vertically supporting said stem portion.

7. In a porosimeter, an upstanding support, a pressure vessel secured to the lower portion of said support, an observation chamber detachably secured to the top portion of said pressure vessel, a sample container disposed in said pressure vessel and having a transparent stem portion, open at its top end and extending vertically into said observation chamber, said observation chamber being formed with a vertical bore portion adapted to receive and to vertically support said stem portion, vertical guide means on the support slidably engaged with said observation chamber, a pump mounted on said support and connected to said pressure vessel, and counterbalance means on said support connected to said observation chamber and arranged to support said chamber in a vertically adjusted position along said guide means, whereby said observation chamber may be lifted vertically for the insertion or removal of said sample container and will be supported in an elevated vertically aligned position relative to the pressure vessel by said counterbalance means.

8. In a porosimeter, a support, a pressure vessel mounted on said support, an observation chamber, means detachably connecting said observation chamber to the top of said pressure vessel in communication therewith, a sample container in said pressure vessel, said sample container comprising a bottom chamber adapted to contain a sample of porous material and a calibrated transparent stem communicating with said bottom chamber and having an open top end, said stem projecting vertically upwardly into said observation chamber, said observation chamber being formed with a vertical bore portion adapted to receive and to vertically support said stem, and means to place the sample container under pressure.

9. In a porosimeter, a support, a pressure vessel mounted on said support, an observation chamber, means detachably connecting said observation chamber to the top of said pressure vessel in communication therewith, a sample container in said pressure vessel, said sample container comprising a bottom chamber adapted to contain a sample of porous material and a calibrated transparent stem communicating with said bottom chamber and having an open top end, said stem projecting vertically upwardly into said observation chamber, said observation chamber being formed with a vertical bore portion adapted to receive and to vertically support said stem, a reservoir containing hydraulic fluid, a pump, and conduit means connecting said reservoir to said pressure vessel through said pump.

10. In a porosimeter, a support, a pressure vessel mounted on said support, an observation chamber, means detachably connecting said observation chamber to the top of said pressure vessel in communication therewith, a sample container in said pressure vessel, said sample container comprising a bottom chamber adapted to contain a sample of porous material and a calibrated transparent stem communicating with said bottom chamber and having an open top end, said stem projecting vertically upwardly into said observation chamber, said observation chamber being formed with a vertical bore portion adapted to receive and to vertically support said stem, a reservoir containing hydraulic fluid, a pump, conduit means connecting said reservoir to said pressure vessel through said pump, and a pressure indicator on said support communicating with said pressure vessel.

11. In a porosimeter, a support, a pressure vessel mounted on said support, an observation chamber, means detachably connecting said observation chamber to the top of said pressure vessel in communication therewith, a sample container in said pressure vessel, said sample container comprising a bottom chamber adapted to contain a sample of porous material, and a calibrated transparent stem communicating with said bottom chamber and having an open top end, said stem projecting vertically upwardly into said observation chamber, said observation chamber being formed with a vertical bore portion adapted to receive and to vertically support said stem, a reservoir containing hydraulic fluid, a pump, conduit means connecting said reservoir to said pressure vessel through said pump, a pressure indicator on said support communicating with said pressure vessel, vertical guide means on said support adjacent said pressure vessel, and means on said observation chamber slidably engaged with said vertical guide means, whereby to facilitate the insertion or removal of the sample container when the observation chamber is detached from the pressure vessel.

12. In a porosimeter, a support, a pressure vessel mounted on said support, an observation chamber, means detachably connecting said observation chamber to the top of said pressure vessel in communication therewith, a sample container in said pressure vessel, said sample container comprising a bottom chamber adapted to contain a sample of porous material, and a calibrated transparent stem communicating with said bottom chamber and having an open top end, said stem projecting vertically upwardly into said observation chamber, said observation chamber being formed with a vertical bore portion adapted to receive and to vertically support said stem, a reservoir containing hydraulic fluid, a pump, conduit means connecting said reservoir to said pressure vessel through said pump, a pressure indicator on said support communicating with said pressure vessel, vertical guide means on said support adjacent said pressure vessel, means on said observation chamber slidably engaged with said vertical guide means, whereby to facilitate the insertion or removal of the sample container when the observation chamber is detached from the pressure vessel, and counterbalance means mounted on said support and connected to said observation chamber, said counterbalance means being formed and arranged to at times support said observation chamber in an elevated position with respect to said pressure vessel.

13. The structure of claim 12, and wherein said vertical guide means comprises a pair of vertical rods secured to said support on opposite sides of the pressure vessel.

References Cited in the file of this patent

UNITED STATES PATENTS

| | | |
|---|---|---|
| 289,855 | Petrehn | Dec. 11, 1883 |
| 2,465,948 | Welge | Mar. 29, 1949 |
| 2,537,668 | Hebard | Jan. 9, 1951 |
| 2,604,779 | Purcell | July 29, 1952 |
| 2,641,924 | Reichertz | June 16, 1953 |
| 2,643,546 | Boehm | June 30, 1953 |
| 2,680,060 | Natelson | June 1, 1954 |
| 2,794,338 | Murphy et al. | June 4, 1957 |